United States Patent [19]

Giles et al.

[11] Patent Number: 5,134,961
[45] Date of Patent: Aug. 4, 1992

[54] ELECTRICALLY ACTUATED VARIABLE FLOW CONTROL SYSTEM

[75] Inventors: Durham K. Giles, Davis; John A. Comino, Turlock, both of Calif.

[73] Assignee: Regents of the University of California, Oakland, Calif.

[21] Appl. No.: 580,108

[22] Filed: Sep. 10, 1990

[51] Int. Cl.$^5$ .............................. B05C 11/00
[52] U.S. Cl. .................... 118/684; 118/300; 239/67; 239/71; 239/101
[58] Field of Search ............ 427/421, 8; 239/67, 239/101, 71; 118/683, 684, 300

[56] References Cited

U.S. PATENT DOCUMENTS

| | | | |
|---|---|---|---|
| 3,747,858 | 7/1973 | Krynicki | 239/101 X |
| 4,164,001 | 8/1979 | Patnaude | 118/684 X |
| 4,590,576 | 5/1986 | Elpiner | 239/67 X |
| 4,823,268 | 4/1989 | Giles et al. | 239/77 X |

*Primary Examiner*—Shrive Beck
*Assistant Examiner*—Alain Bashore
*Attorney, Agent, or Firm*—Owen, Wickersham & Erickson

[57] ABSTRACT

An electrically-actuated liquid spraying system for controlling the volumetric flow through pressure-atomization spray nozzles is disclosed. Each nozzle is attached to a direct acting, in-line solenoid valve which is connected to a liquid supply at constant pressure. The valve is excited by square wave pulses of variable frequency and duty cycle to reciprocate between its fully open and closed positions and thereby control the flowrate over a range without changing droplet size and spray pattern. The frequency and duty cycle of the square wave pulses are varied and controlled by feedback data of relative target movement, size, shape and other factors as well as by gated sampling of the dynamic pressure in a region between the valve seat and nozzle orifice.

10 Claims, 15 Drawing Sheets

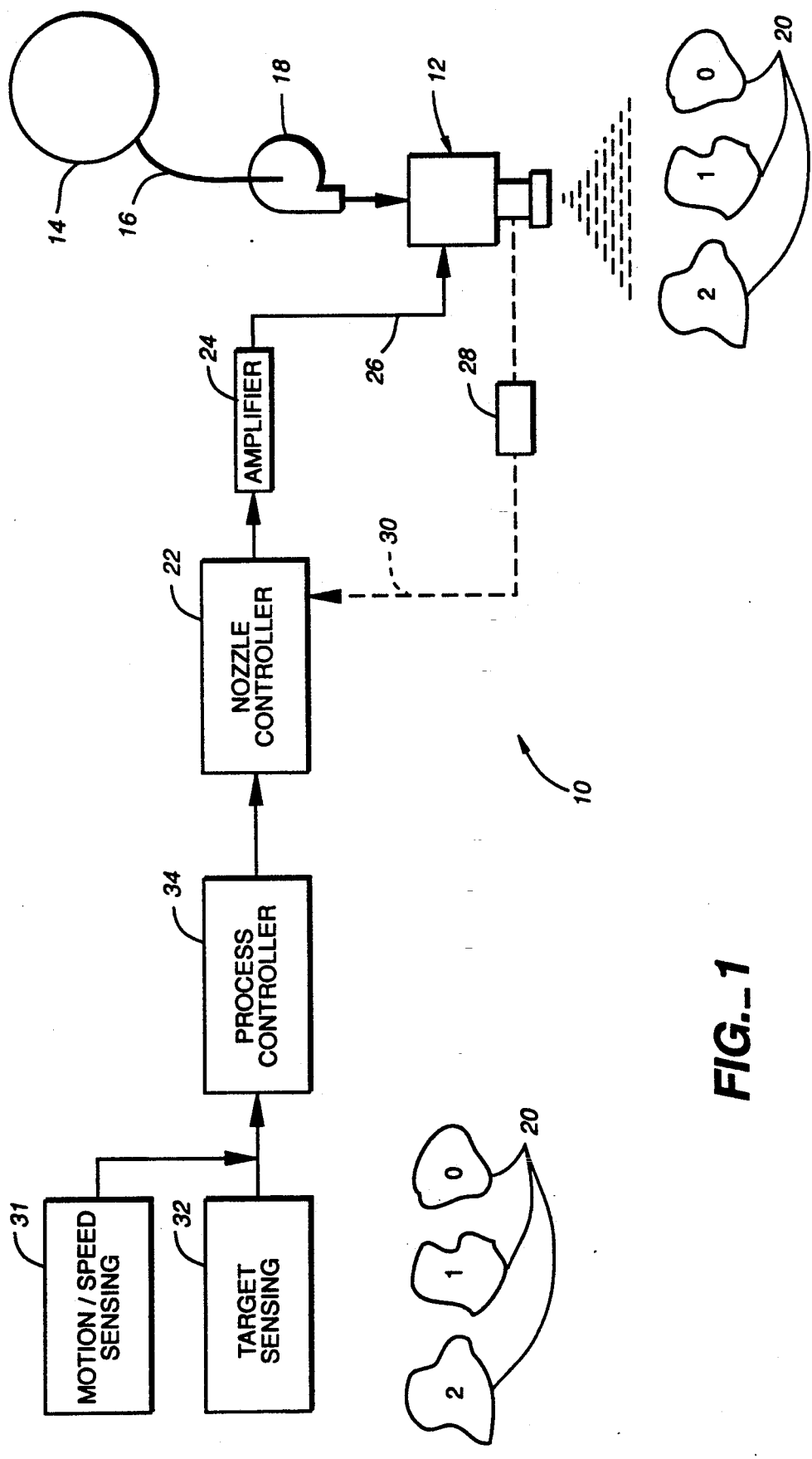
FIG.—1

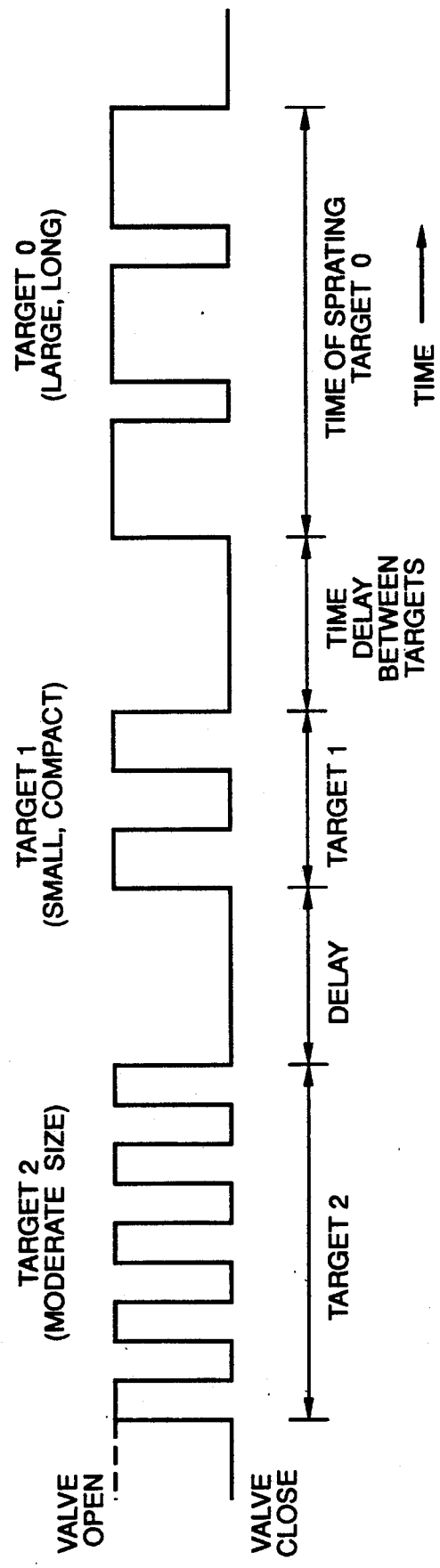
FIG._1A

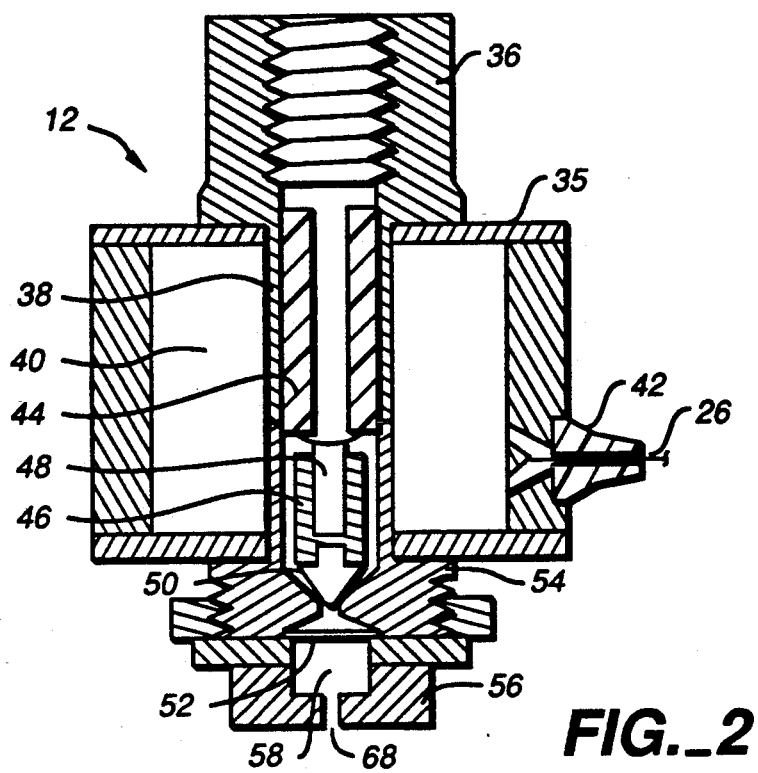
FIG._2
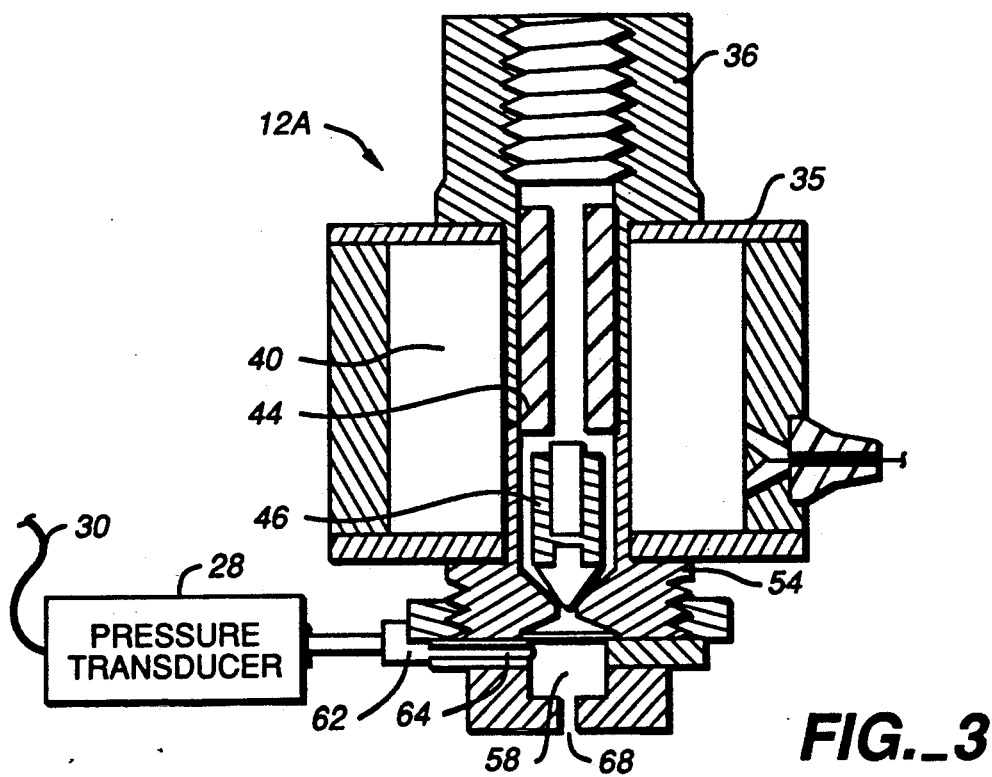
FIG._3

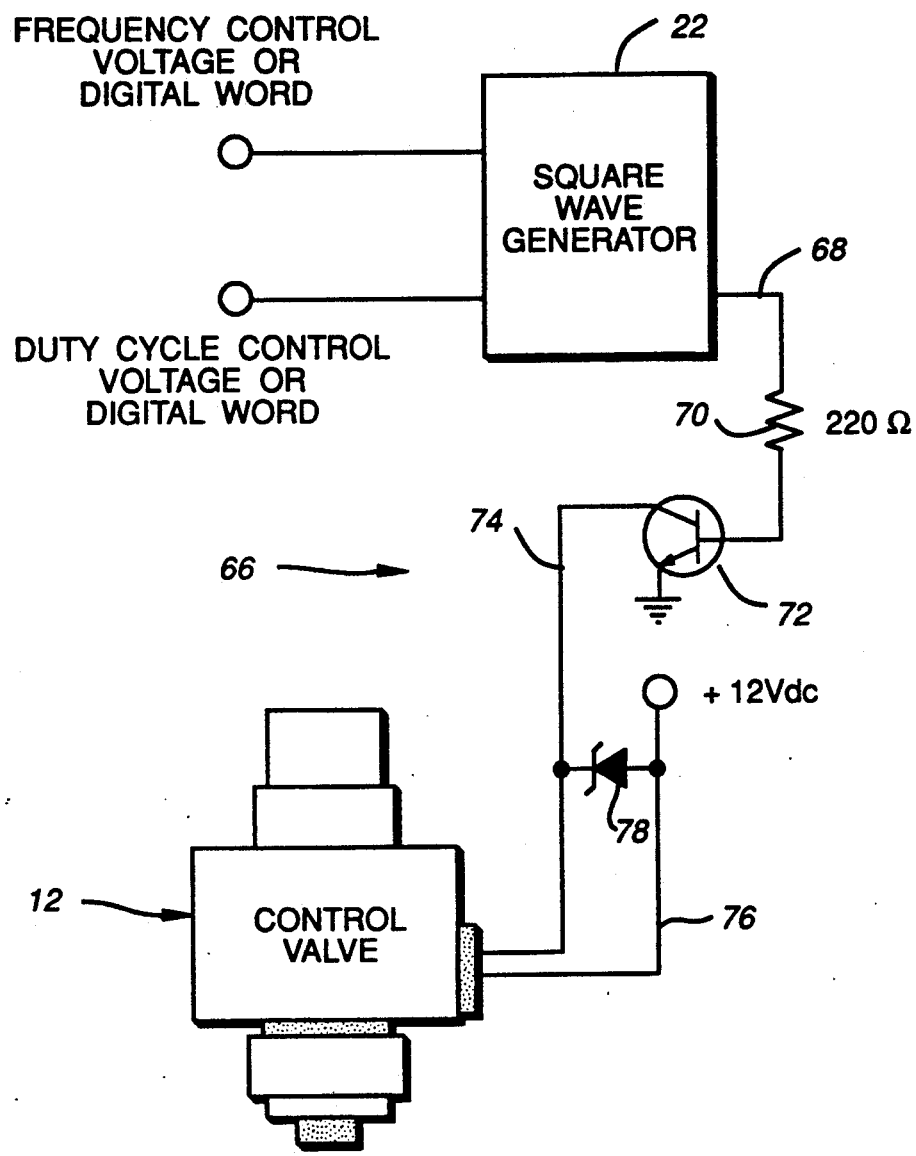
FIG._4

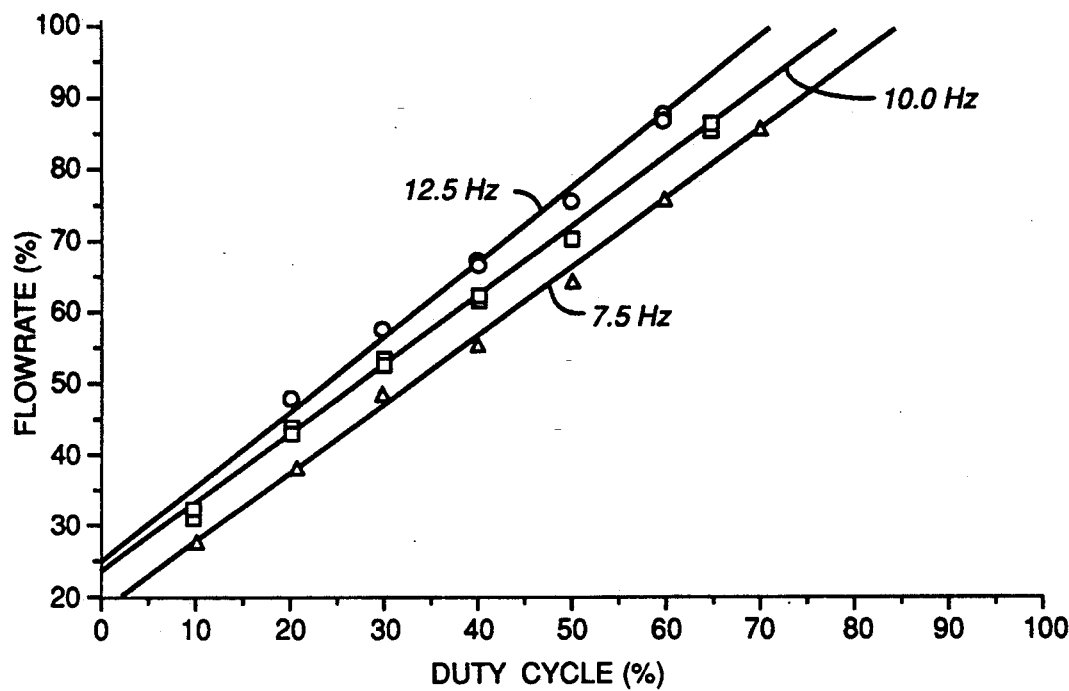
FIG._5A
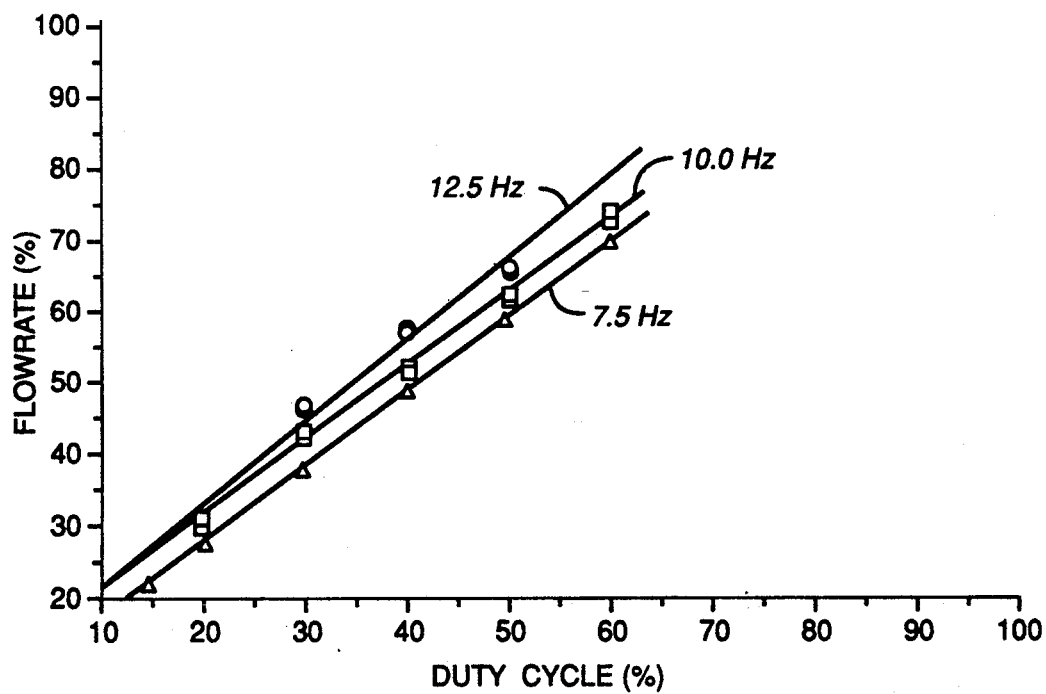
FIG._5B

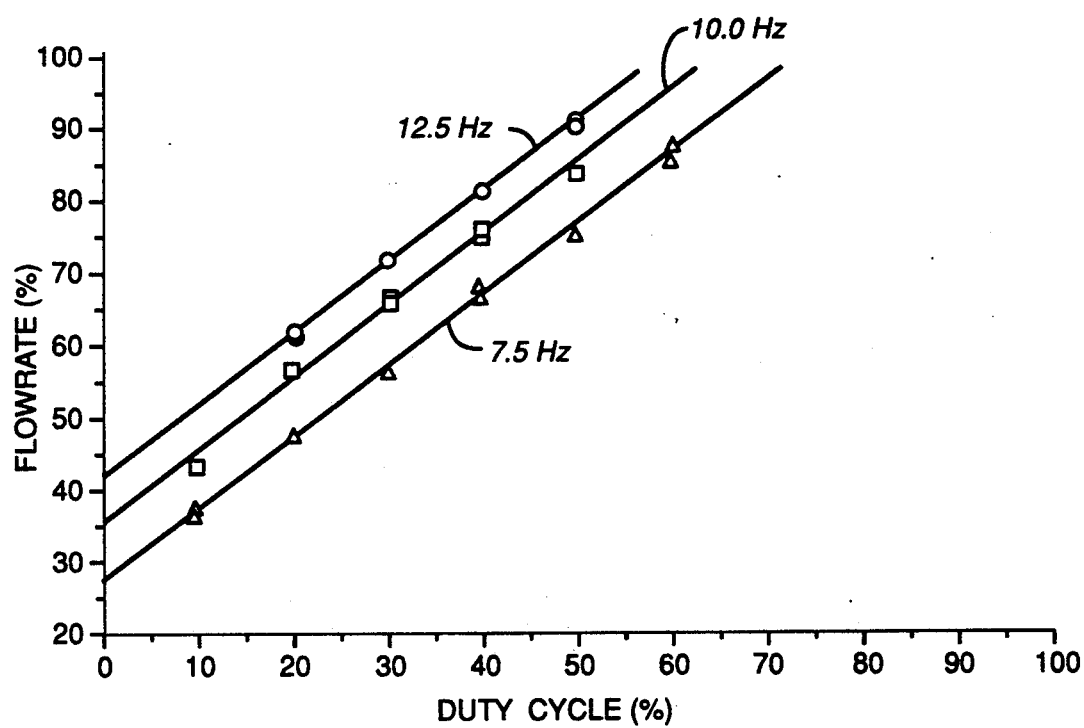
FIG._5C

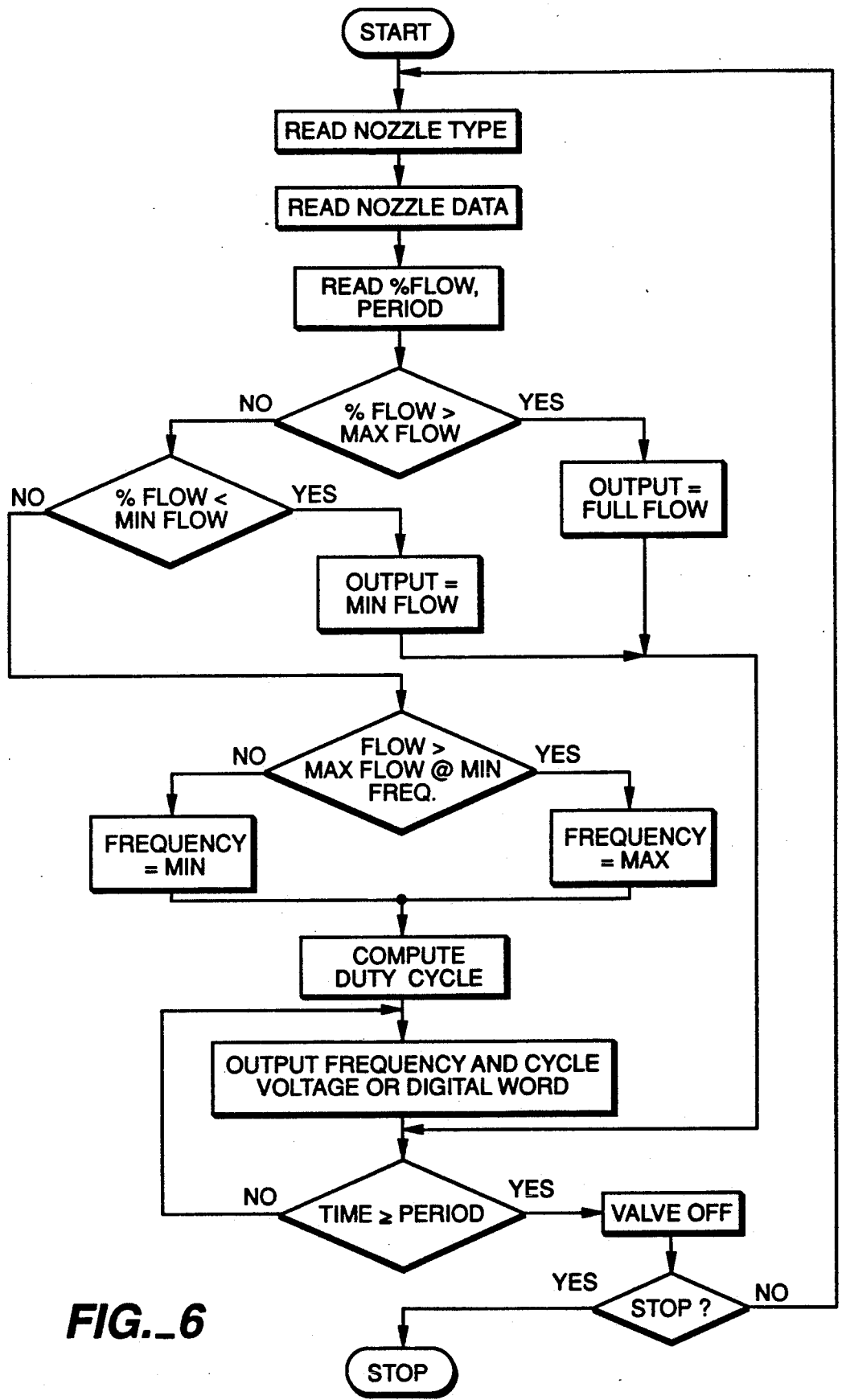
FIG._6

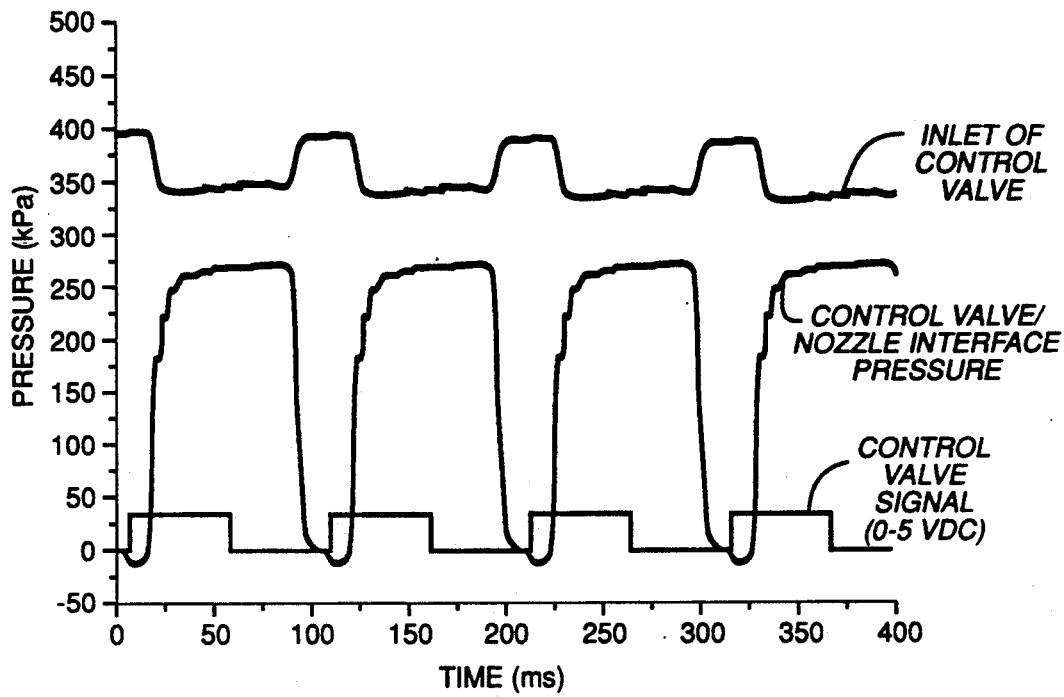
FIG._7A
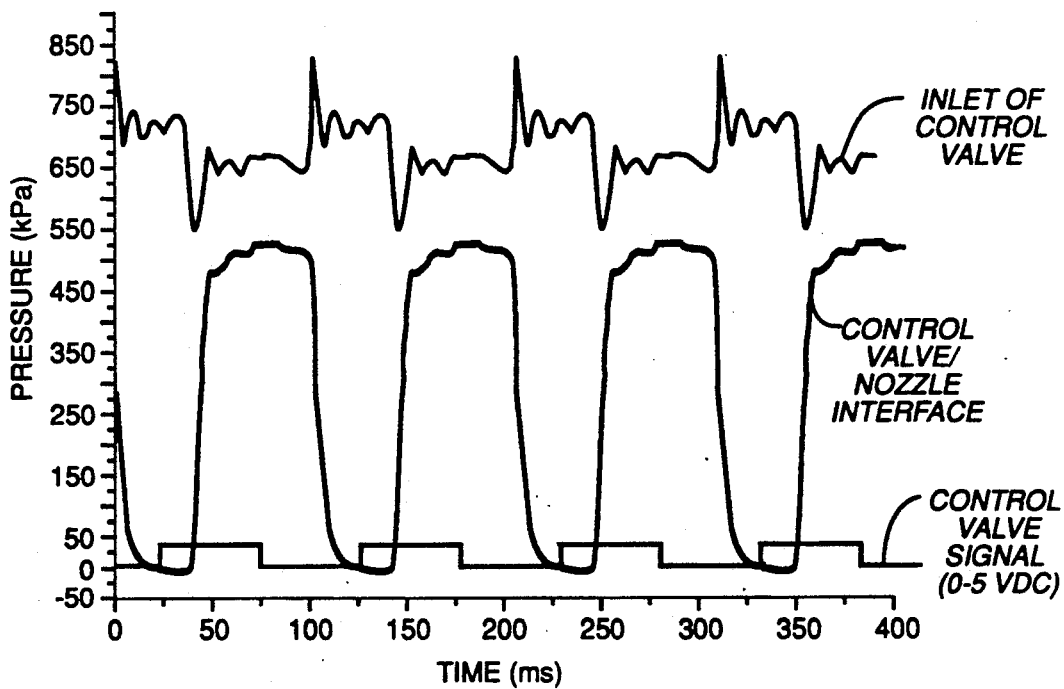
FIG._7B

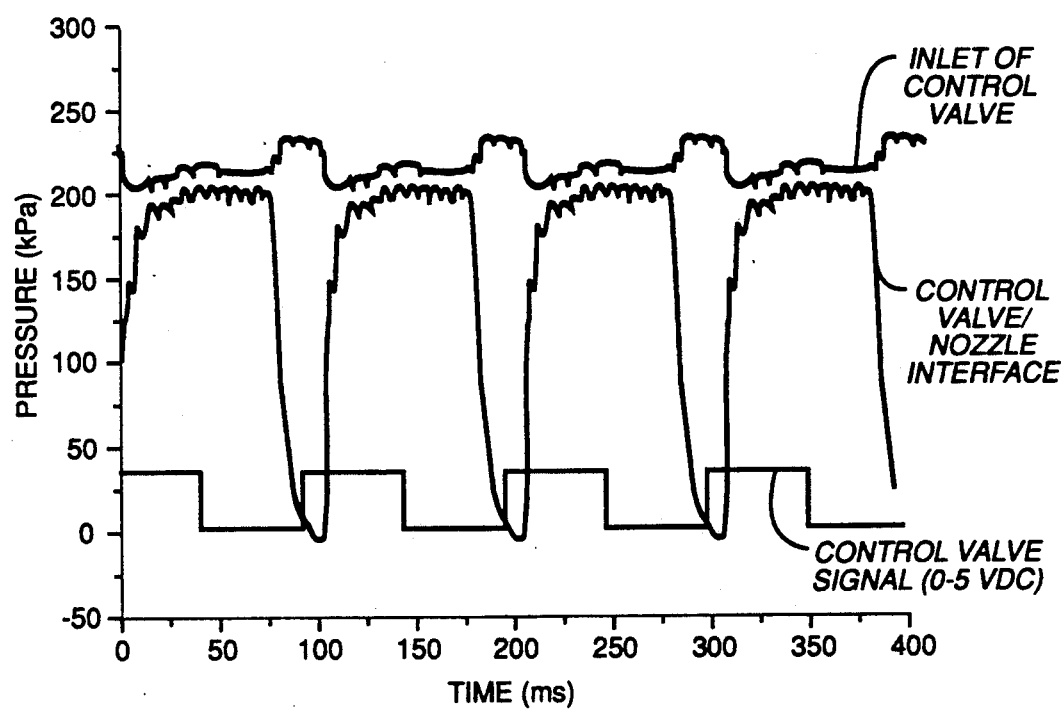
FIG._7C

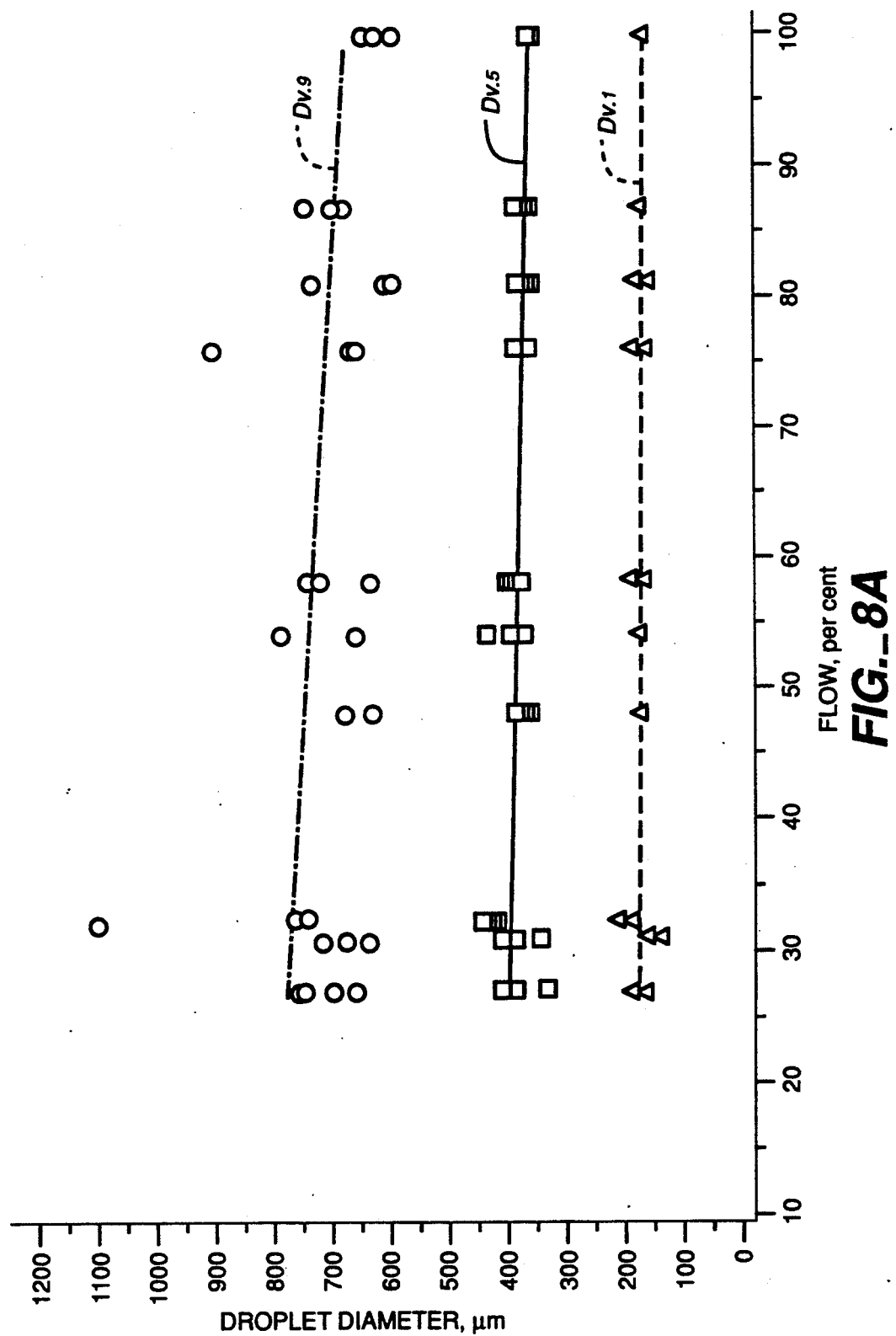
FIG._8A

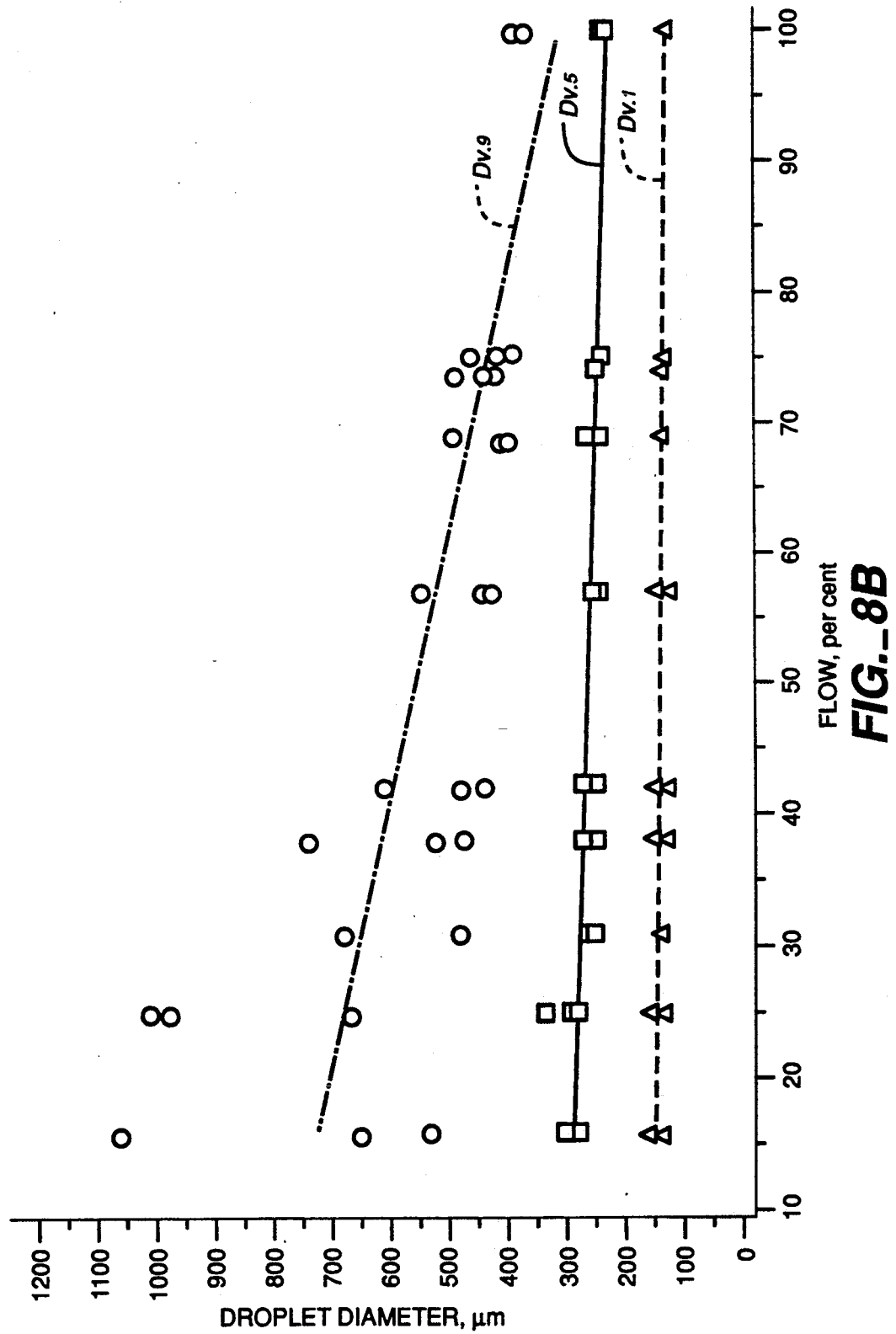
FIG._8B

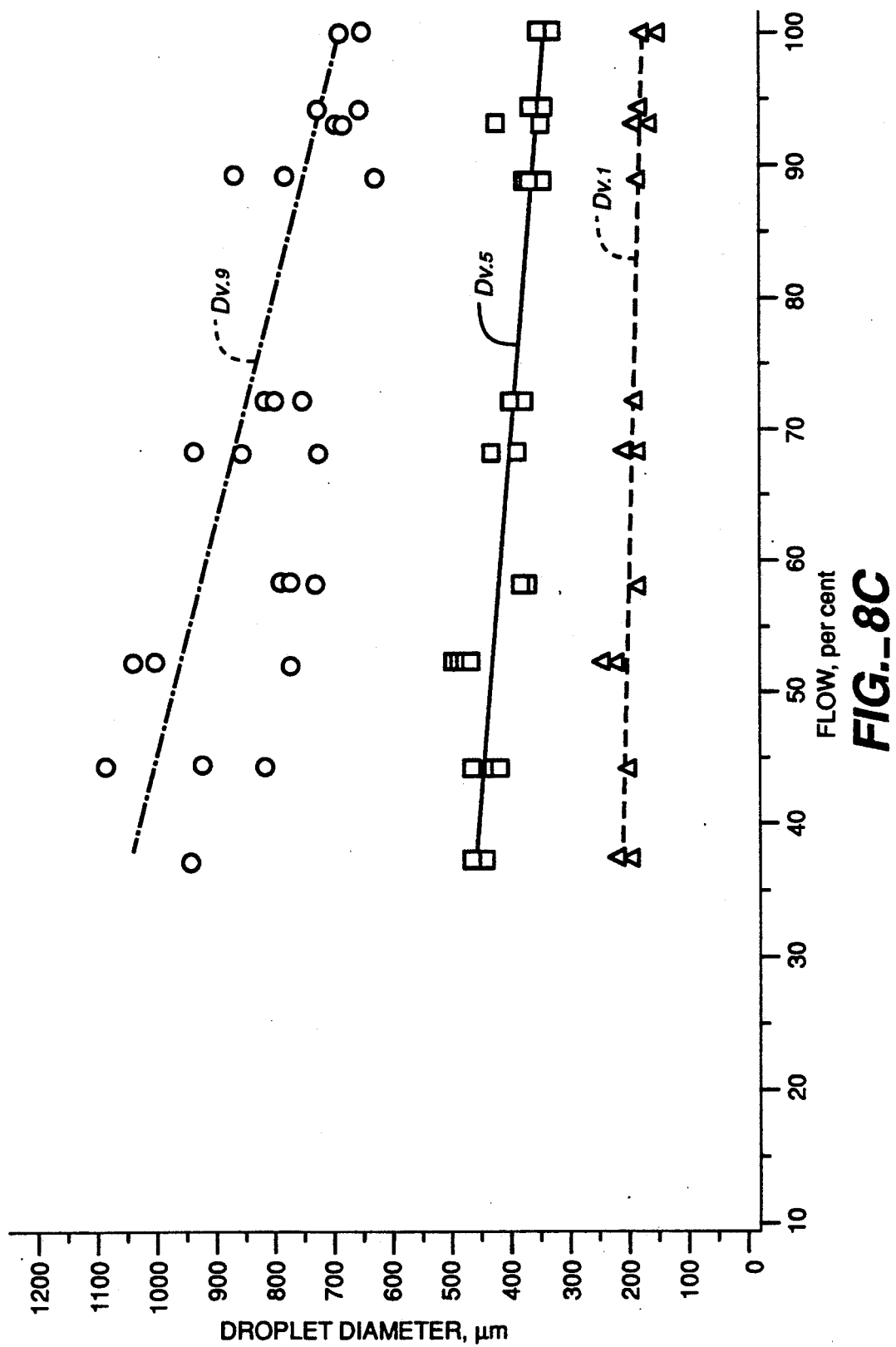
FIG._8C

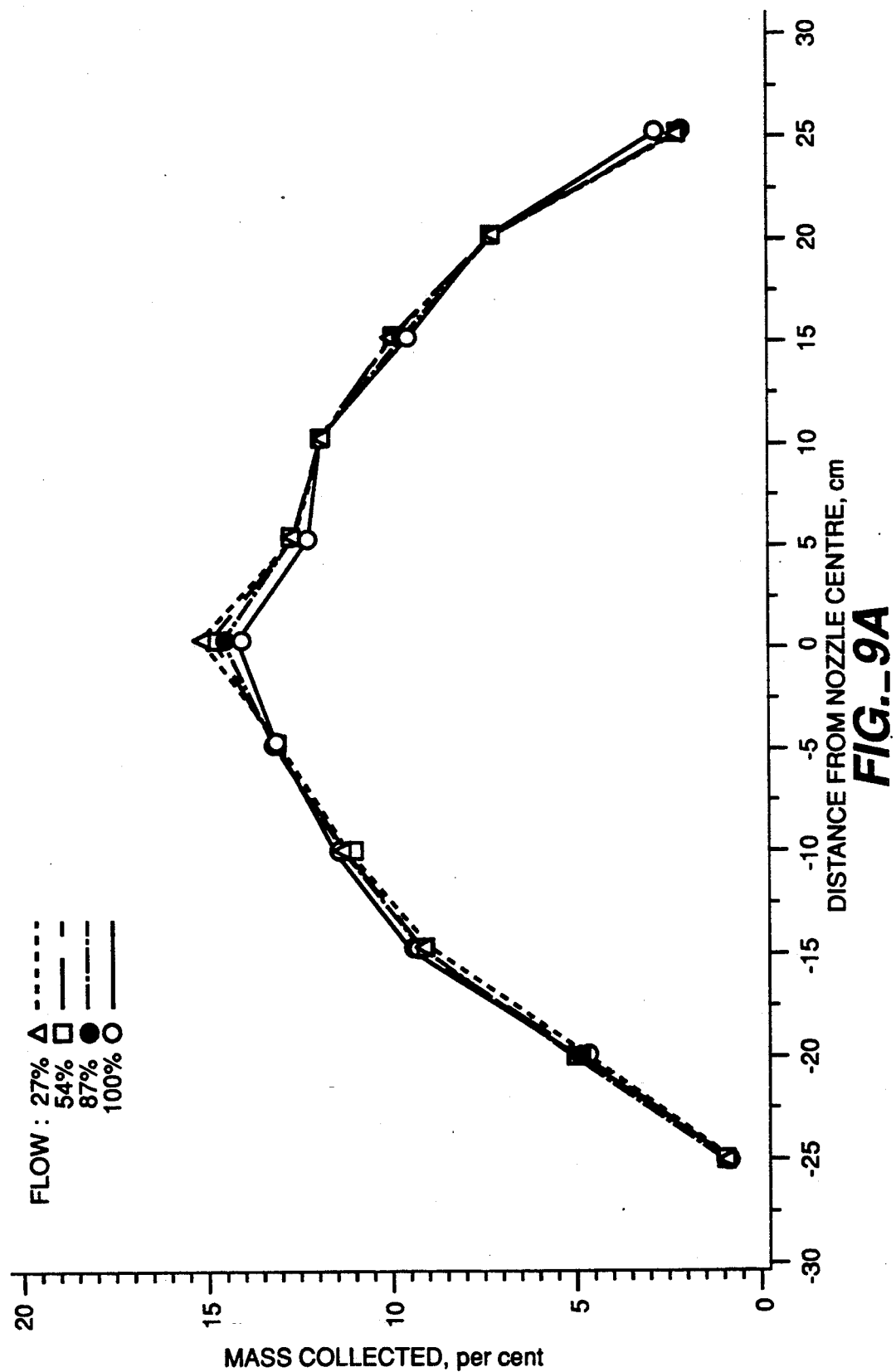
FIG._9A

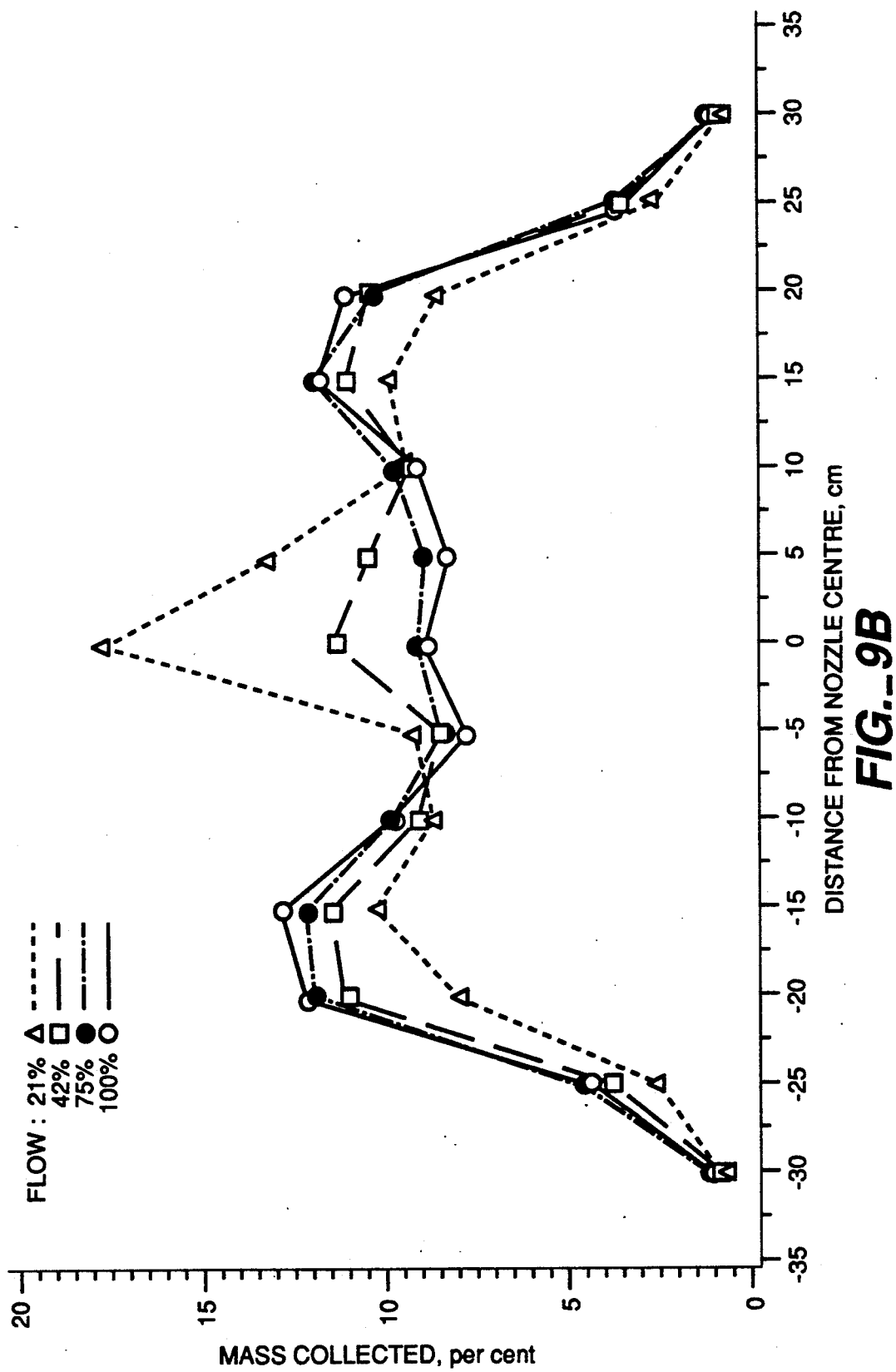
FIG._9B

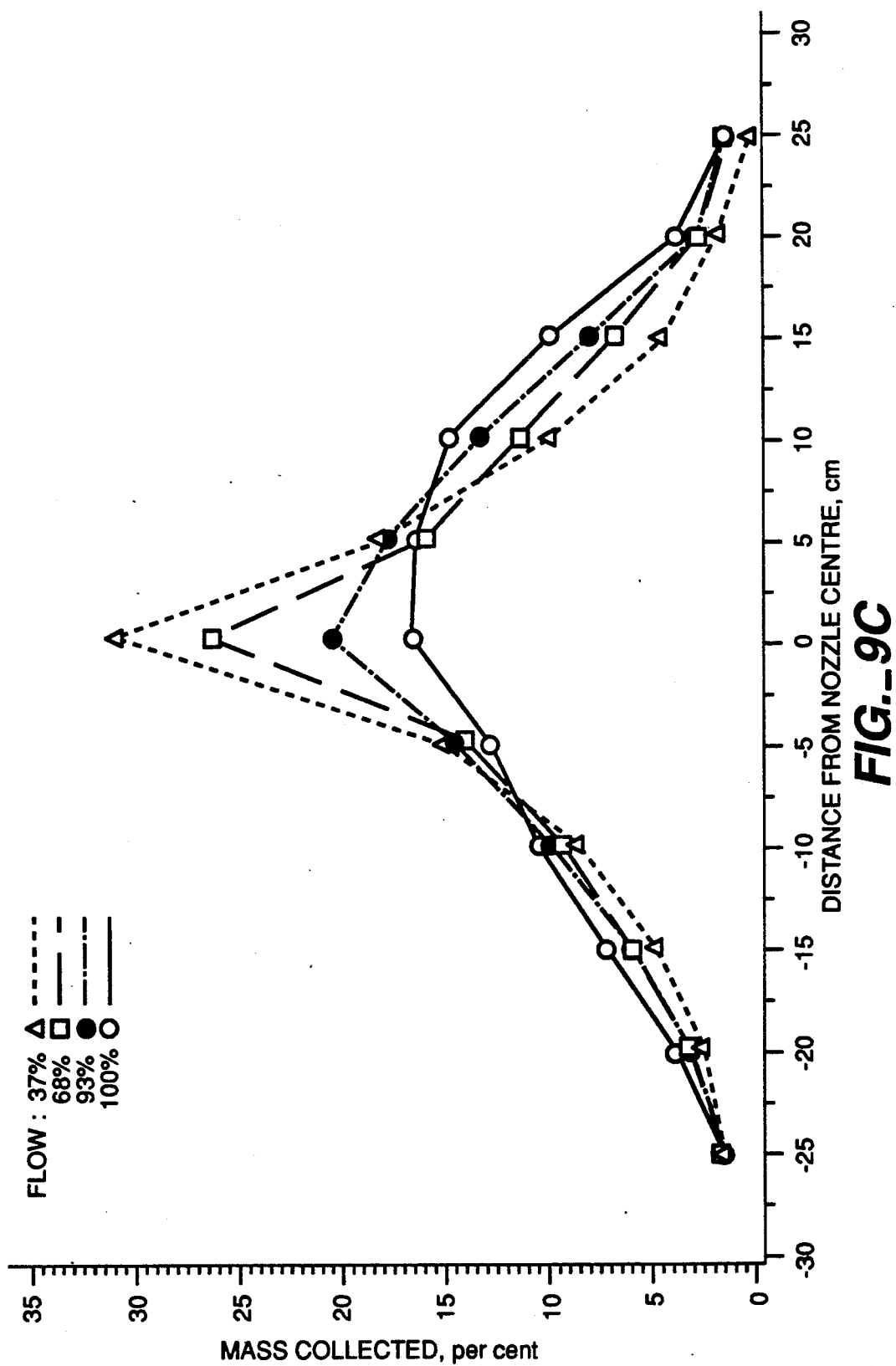
FIG._9C

ELECTRICALLY ACTUATED VARIABLE FLOW CONTROL SYSTEM

This invention relates to liquid spraying systems, and more particularly to an electrically actuated system for controlling volumetric flow through pressure-atomization spray nozzles.

BACKGROUND OF THE INVENTION

The majority of agricultural pesticide, fertilizer and other agents are applied in liquid sprays. The goal of an optimal spraying system is to deliver and deposit a precise amount of material uniformly and exclusively upon a target area. In a perfect system, only an exact (minimum) amount of material required would be released and all material discharged from the sprayer would ultimately reach the desired target. Industrial spray systems, when operating in controlled environments with well-defined, non-variable targets can often achieve near-optimal performance.

However, other systems such as agricultural sprayers often operate in adverse environments with poorly defined and highly variable target geometries. The operating parameters of an agricultural field sprayer are typically set by the operator at the start of the season and seldom, if ever, modified for changes in the target crop. As the crop morphology changes due to the plant growth or simple variation within a field, the effective application rate of the material (per unit of target crop) varies accordingly. In areas of the field where spray target volume, mass or area is sparse, excessive material may be released and correspondingly, in areas of dense target, poor spray deposition may result in reduced biological efficacy of applied pesticides.

Recently the environmental effects of pesticide use in agriculture have come under much public scrutiny. Concern about possible pollution of the environment has led to tighter restrictions on the use and methods of application and licensing of agricultural pesticides. It has been estimated that at least one billion dollars have been lost annually due to the excessive and inefficient application of agricultural chemicals. One study reported that only 25% of commercial applicators and farm operators applied chemicals within 5% of the proper application rate, and that misapplication ranged from 60% under-application to more than 90% over-application. Thus, the need has become apparent for increasing the accuracy and efficiency of the pesticide application process in order to reduce potential environmental pollution and decrease the overall amount of chemical applied.

Two common ways of expressing application rate in agricultural spraying are active chemical rate and spray rate. ASAE Standard Engineering Practice EP327.1 (1988) defines active chemical rate as "The amount of active ingredient applied per unit treated, expressed in terms of mass per relevant unit treated, i.e. (kg/ha)" and spray rate as "The amount of spray liquid [emitted by an application unit during treatment] expressed in liquid volume per unit treated, i.e. (L/ha)".

Adjustment of application rates for a given agricultural sprayer has historically been accomplished by changing the system pressure (and correspondingly, the flowrate) and/or varying the ground speed. There are numerous drawbacks to these methods of controlling chemical application. First, a constant ground speed is difficult to maintain in the field due to turning, operator error, and variable field conditions which affect wheel slip. Constant or precise speed is dependent on operator skill, uniform field conditions and slope. Secondly, the crop canopy volume, shape or density may vary throughout the field causing non-uniform conditions. This can be caused by either incomplete plant coverage of the field area, such as missing or small plants, or natural differences in plant foliage density. As a result, these variations can lead to over-application of chemical in some areas because the maximum application rate is often selected for the entire field. Therefore, uneven application rates can result with either variable speeds or variable crop condition causing variation in spray rate and/or chemical rate.

Methods have been investigated that can monitor both the sprayer unit ground speed and the density or presence of plant material. Such methods, described in U.S. Pat. No. 4,823,268, for example, allow for changing the application rate with respect to ground speed and to plant canopy volume and shape. However, many spray systems heretofore employed utilized pressure variation to control flowrate and did not maintain a constant droplet size spectrum or a constant spray pattern as the nozzle flowrate was varied. This led to problems of spray drift (small droplets) or inadequate spray coverage (large droplets) resulting in environmental pollution and poor pest control.

In other spray systems, such as that described in U.S. Pat. No. 4,823,268, flowrate from the sprayer was controlled by adjusting the number of spray nozzles or spray nozzle manifolds which were operating. With such a method, only a few discrete levels of flowrate, rather than a continuous range of flowrate are possible. Using this method, the spray pattern from the sprayer may also be adversely affected as flow is varied.

Control of sprayer output using pressure variation at the nozzles introduces two undesirable effects in the chemical application process. First, the system response to changes in speed of the spray system vehicle can be unacceptably slow. In operation, the speed error must first occur, be sensed by the system, a control decision be made and physically implemented. Such systems can only respond to application errors rather than anticipate and prevent them. Further, the pressure-type flow control valves heretofore used for sprayer actuation were generally slow in response. With a slow response rate, use of such control systems could result in increased, rather than reduced application errors. If a ground speed variation was brief in duration, the system would not respond with an altered sprayer flow rate until the speed has returned to normal. In such cases, use of the system resulted in two occurrences of application error, rather than the single error if no control system had been used.

The second undesirable effect of pressure variation systems involves the atomization process in the spray nozzles. With conventional agricultural spray nozzles, the liquid flow rate liquid supply pressure, droplet size spectra and spray distribution pattern of the spray are interrelated. When the flow rate of liquid through the nozzle is controlled by varying the supply pressure, the droplet size spectrum and the distribution pattern of the spray cloud are also altered. The droplet size variation can be unacceptable as droplet size is often a prime design consideration in sprayer system design.

An additional disadvantage of pressure variation for flow control is the non-linear (square-root) relationship between operating pressure and resulting flowrate of liquid through a nozzle orifice. For example, to achieve a 3:1 range of flow control, a 9:1 range of pressure variation would be necessary.

Recognizing the aforesaid deficiencies and limitations of previous methods and systems it is therefore one object of the present invention to provide a variable-flow spraying system including a controller capable of varying the flowrate through a nozzle without adversely affecting the spray characteristics of the nozzle and more specifically, without distorting the droplet size spectra or distribution pattern of the nozzle.

Another object of the present invention is to provide a spraying system with a flow control device that can be electrically actuated by signals compatible with digital, micro-processor-based controllers.

Another object of the present invention is to provide a spraying device that can be compatible with and directly coupled to conventional agricultural spray nozzles.

Another object of the present invention is to provide a spraying device than can operate to produce rapid changes in nozzle flow rate when desired, utilizing a dynamic response time less than 80 ms.

SUMMARY OF THE INVENTION

The aforesaid objects of the invention are accomplished by a spraying system utilizing a device which modulates nozzle flow by intermittent operation of an electrical solenoid valve attached to and located directly upstream of a spray nozzle. By cycling the valve open and closed, the flow rate through the nozzle is controlled in an analogous on/off manner. The valve is cycled by means of an electrical signal consisting of a square wave of variable duty cycle and frequency. This provides a control valve excitation that enables control of the timing and rate of mass flow through the attached nozzle. Using a square wave digital signal also enables the valve device to maintain compatibility with a microprocessor controller in the spraying system. By operating the valve/nozzle device at only two flow conditions, namely, full pressure (completely open valve) and zero pressure (completely closed valve), distortion of droplet size spectra and spray pattern for the device are minimized. To accomplish this result, the actuation time of the valve is brief in relation to the time spent in the fully open or closed position. Also, it is required that the volume of the region between the control valve tip and the nozzle orifice be minimized since excessive volume at this location would result in fluid damping of the intermittent flow and correspondingly, excessive transient nozzle operation at less than full pressure.

In one embodiment of the invention, as described, a solenoid valve has a body with a fluid inlet adapted for connection with a pressurized supply of liquid to be sprayed. The fluid inlet feeds a central passage containing a fixed annular core surrounded by a coil. A movable core member with a tapered front end is aligned with the fixed core and is separated therefrom by a coiled spring. A retainer ring on the valve housing has a central opening and supports a nozzle member having a selected configuration. The valve core is connected through an electric circuit to a duty cycle timer connected to a frequency stage timer which together control the timing frequency and duty cycle for the square pulses to the valve device. In the operation of the valve device, the liquid supply pressure to the valve/nozzle device (as measured by a valve/nozzle interface pressure transducer) is set at a nominal operating point for the type of nozzle being used. The nozzle is then excited at a selected frequency, e.g. 7.5, 10.0 or 12.5 HZ and the duty cycle is varied over the range of operational limits to provide the desired flowrate. The period of operation is also controllable.

Tests utilizing three different types of nozzles demonstrated that an approximately 3:1 range in flowrate through each was controllable by varying the duty cycle for different valve actuation frequencies. For the full range of operating conditions the droplet size spectra and spray distribution pattern produced by the nozzles were essentially constant as flowrate was varied. Thus, by utilizing a valve/nozzle device according to the present invention, rapid and precise control of flowrate in a spraying system can be accomplished without the undesirable characteristics of prior spraying systems.

Other objects, advantages and features of the invention will become apparent from the following detailed description thereof, presented in conjunction with the accompanying drawing.

BRIEF DESCRIPTION OF THE DRAWING

FIG. 1 is a diagrammatic representation of a typical spraying system utilizing a modulated valve/nozzle device according to the invention.

FIG. 1A is a diagram showing typical control signal pulses for driving the modulated valve/nozzle device of FIG. 1 to achieve different flowrates for various target characteristics.

FIG. 2 is a view in elevation and in section of a valve/nozzle device embodying features of the present invention.

FIG. 3 is a view in elevation and in section of a valve/nozzle device similar to FIG. 2 and having a pressure transducer.

FIG. 4 is a circuit diagram showing the control system for driving the valve/nozzle device of FIG. 2, according to the invention.

FIGS. 5A, 5B and 5C represent data and fitted lines of flowrate versus duty cycle at various frequencies for three different nozzle configurations.

FIG. 6 is a flow chart for the control algorithm utilized in a spraying system according to the present invention.

FIGS. 7A, 7B and 7C are typical high-speed data traces shown with control valve signals for different nozzle configurations.

FIGS. 8A, 8B and 8C are observed experimental data showing the volume median diameter of spray droplets in the spray from flat-fan, hollow-cone and solid-cone nozzles.

FIGS. 9A, 9B and 9C are observed experimental data which show the spatial distribution of spray from flat-fan, solid-cone and hollow-cone nozzles.

DETAILED DESCRIPTION OF EMBODIMENT

In broad terms, a principle objective of the present invention is to control the volume, timing and flow rate of liquid through a spray nozzle device without distortion of droplet size spectrum or spray distribution pattern. The aforesaid control is accomplished by rapid, intermittent operation of a flow control valve positioned as closely as physically possible to the nozzle orifice. By operating the nozzle at only two states, fully pressurized or completely off, the full flow (continuous) operation characteristics of the nozzle are maintained and the mean flow rate is controlled by varying the relative time during which the nozzle is on or off.

With reference to the drawing, FIG. 1 shows schematically a spraying apparatus 10 utilizing an electrically-actuated valve/nozzle device 12 for controlling volumetric flow through pressure-atomization spray nozzles embodying principles of the present invention. The apparatus may be mounted on a movable vehicle (not shown) which supports a liquid supply tank 14 having an outlet conduit 16 connected through a pump 18 to the device or plurality of devices 12 which is directed toward a plurality of spray targets 20 such as plants, foliage or the like. A nozzle controller 22 is electrically connected through an amplifier 24 to the valve/nozzle device 12 via a pair of electrical leads 26. A pressure sensor 28 on the device may be used to provide a feedback to the controller 22 via a lead 30. A target sensing or detection means 32 is provided on the spraying apparatus 10 to provide input data to a process controller 34 regarding the targets 20. The process controller compares the target data with stored tables in a processor memory and provides the desired spray data to the nozzle controller 22. The latter is a variable frequency, variable duty cycle, square wave generator that produces the output pulses with the desired frequency and width or time duration. Typical operation of the spraying apparatus entails its location along a line of spray targets with relative motion occurring between the targets and the spraying system 10. In agricultural field spraying, the targets 20 may be plants fixed in the soil and the sprayer would be moved by its vehicle across the field. In an industrial application, the sprayer system could be fixed and with the targets moving past on a conveyer belt or an assembly line. In either case, there is relative motion between the spray targets and the sprayer system.

Motion (displacement) or ground speed is sensed by a system 31 which provides a data input to determine the spray output timing to assure proper time delay and alignment between the target and the spray nozzle when the spray is discharged. If spray output is to be controlled based on the relative speed between the spraying apparatus and the targets, the system senses and forwards data indicating the relative speed.

As each target moves past a sensing area, the target sensing means 32 detects information such as: 1) Presence of the target, i.e., a target is there; 2) the size (length, height, mass, volume, etc.) of the target; 3) the shape, density or other physical characteristics of the target; 4) any other information necessary to determine how much spray material should be released for the target.

The sensing means 32 could be visual, gravimetric, ultrasonic or any other technique. An example of such sensing means used with a spraying system is shown in U.S. Pat. No. 4,823,268.

The appropriate target information, for each target or collection of targets is pre-processed by the sensing subsystem and then transferred through electronic means (analog or digital) to the spray process controller 34. The process controller receives the sensed target information and determines (using criteria programmed in by the user) the desired characteristics (such as mass, flowrate, or duration) of the spray output. The control criteria are based on the user's desired spray deposition and knowledge of the typical target characteristics. (For example, if target 1 is only ½ the size of target 0, then the spray mass output for target 1 is only ½ the size of target 0. As another example, if target 1 is twice as long as target 0, then the spray nozzle should remain on twice as long.) The process controller subsystem may not necessarily generate the actual electrical signal sent to the control valve, it only determines the desired spray characteristics. The information concerning the desired spray output is then sent electronically via digital or analog signals to the nozzle controller 22.

The nozzle controller 22 receives the spray flowrate and timing request from the sub-system 34. It then calculates the required digital signal characteristics (most significantly, frequency, duty cycle and duration) necessary to achieve the desired spray output. This calculation is based on preprogrammed characteristics of the particular spray nozzle being used. (See, for example, Table A and FIGS. 5A, 5B and 5C. This digital signal is then amplified by amplifier 24 (from low power control logic levels to higher power, valve-driving levels) and sent to the valve/nozzle 12 at the appropriate time to achieve the desired spray deposit on the target.

The valve nozzle/device 12 receives the digital signal from the driver and opens and closes in response to the signal so that flow through the nozzle is controlled in a rapid on/off manner.

Optionally, the pressure transducer 28 may be positioned between the valve and the nozzle of device 12 to provide a pressure signal that is a direct indicator of the nozzle flow. This signal can be used as a feedback to verify proper nozzle controller flow characteristics. Thus controller 22 could receive the signals, process them to determine if they correspond with the desired flow characteristics, and make corrections to its driver signal output to achieve more precise and accurate control of the valve nozzle device 12.

FIG. 1A illustrates a hypothetical control signal from the nozzle-controller to the valve nozzle device 12. For example, if a target 0 is a long target and has a high mass which requires a great deal of spray, the duty cycle is high and the spraying event time is long. The nozzle is then turned off between targets.

If target 1 is a small, compact target which requires a small amount of spray, the duty cycle is low and the spraying event is brief. The nozzle is then turned off between targets.

Finally, if target 2 is of moderate size and length, the signal is of moderate duty cycle and length. After spraying target 2, the nozzle is then turned off until the next target approaches.

As shown in FIG. 2, the valve/nozzle device 12 comprises a solenoid valve body 35 having an annular inlet fitting 36 on one side which is internally threaded so as to connect with the end of fluid conduit 18. A relatively thin tubular sleeve portion 38 extends from the fitting 36 through the valve body 35. Surrounding the sleeve portion 38 within the body is a coil 40 which is connected to the pair of leads 26 that extend through a fitting 42 to the controller 22. Within the sleeve 38 is a fixed annular iron core 44. Aligned with the fixed core is a movable valve member 46. Extending from the movable valve member is a coil spring 48 which engages the end of the fixed core and urges a tapered end 50 on the movable member into a central opening 52 of a retainer ring 54. The latter is fixed to the sleeve 38 and held firmly to the valve body 35. The retainer ring has external threads so as to receive a nozzle 56 which forms an internal chamber 58 on the outside of the retainer ring opening 52 and has an orifice 60 of a preselected size and shape. The threads on the retainer ring enable various nozzle configurations providing different spray patterns to be quickly and easily attached. In operation, the valve is magnetically opened when activation of the coil by a pulse causes the movable member 46 to move towards the fixed core 44. When the pulse ceases, the differential in pressure between the back and the front of the movable tapered end 50 or needle, plus the force of spring 48 causes the movable valve 46 to close. In an alternate form, not shown, the movable valve member could be electrically moved in both directions, thereby eliminating the spring and providing a somewhat different valving action.

In a modified valve/nozzle device 12A, as shown in FIG. 3 the pressure sensor 28 such as a piezo-resistive pressure transducer is attached by a fitting 62 to the retainer ring 54. A narrow slot 64 (e.g. 3.2 mm) is cut in the retainer ring face and connects with a similar sized hole in the wall of the ring to provide a pressure tap from the internal chamber 58 to the transducer 28. As previously described, this pressure transducer 28 on the valve/nozzle device 12A enables it to be calibrated so as to provide a useful performance range under different operating conditions.

As shown in FIG. 4, a driver circuit 66 interconnects the valve/nozzle 12 and comprises a variable frequency, variable duty cycle square wave generator or nozzle controller 22. As previously described, the controller 22 receives frequency control input voltage or digital control word and a duty cycle control voltage or digital control word from the process controller 34, shown in FIG. 1. The pulse output via a lead 68 from the square wave generator or controller 22 is furnished through a resistor 70 (e.g. 220 ohms) to the base of a Darlington transistor 72 which serves as an amplifier. The emitter of transistor 72 is connected to ground potential while its collector is connected by a lead 74 to one terminal of the solenoid coil for the device 12. The other terminal of the solenoid coil is connected by a lead 76 to a voltage source (e.g. 12 vdc) and a diode electrical surge supressor 78 is provided between leads 74 and 76. Other circuit arrangements could also be used to apply the square wave pulses to the valve device 12.

The term duty cycle of the control valve as used herein is defined as the percentage of the time the valve is open divided by the total operation time (open and closed).

In accordance with the invention, the relationship between the frequency and duty cycle of the excitation signal from the controller 22 and the resulting liquid flow rate through the nozzle configuration on the device 12 must be determined and stored digitally in logic memory of the control processor 22. To illustrate the frequency and duty cycle relationship, data and resulting plots were determined for each of three sample nozzles. These nozzles included a flat-fan, a hollow-cone and a solid-cone nozzle, all of which are configurations well known in the spraying art. The liquid supply pressure to each nozzle (as measured by a valve/-nozzle interface pressure transducer 28) was set at the nominal nozzle operating point. The nozzle was excited at frequencies of 7.5, 10.0 and 12.5 Hz and the duty cycle varied over the range of operational limits. Flow was measured by operating the nozzle for a fixed time period (typically 1-2 min) and measuring the discharged flow. A linear model was fit to the data for each frequency. The form of the model was:

$$Y = \quad \text{(Equation 1)}$$

where:
Y = flow rate (% full flow),
= intercept (% full flow),
= slope (% flow/duty cycle %), and
X = duty cycle of excitation frequency (%).

The data for the three nozzles tested are graphically shown in FIGS. 5A, 5B and 5C and the statistical results appear in the following Table A. Generally, at a fixed excitation frequency, the relationship between duty cycle and flow was linear. At a fixed duty cycle, flow was noted to increase with increasing frequency.

TABLE A

Statistical parameters of relationships between signal duty cycle and corresponding flow for each nozzle tip and excitation frequency.

| Nozzle Type | Frequency (Hz) | Intercept Estimate ( ) | Slope Estimate ( ) | Equation $r^2$ |
|---|---|---|---|---|
| Flat Fan | 7.5 | 18.132 | 0.9573 | 0.996 |
| | 10.0 | 23.329 | 0.9736 | 0.995 |
| | 12.5 | 24.531 | 1.0565 | 0.990 |
| Hollow Cone | 7.5 | 5.698 | 1.0636 | 0.998 |
| | 10.0 | 9.887 | 1.0527 | 0.997 |
| | 12.5 | 9.847 | 1.1470 | 0.980 |
| Solid Cone | 7.5 | 26.828 | 1.0202 | 0.999 |
| | 10.0 | 35.320 | 1.0233 | 0.992 |
| | 12.5 | 41.861 | 1.0126 | 0.998 |

Measurement of the pressure at the valve/nozzle interface allowed detailed study of the nozzle device 12A operation. Specifically, the volumetric flow through each nozzle could be predicted from the pressure measurements taken over a sample period of controller operation. Further, the dynamic behavior of the controller-nozzle flow system could be characterized.

To support the development, testing and ultimately, the operation of the control valve/nozzle 12, a control algorithm was needed which would read a percent flow desired and determine proper duty cycle and frequency control voltages to provide a controller output to the interface or drive circuit.

The criteria for proper valve operation were: 1) valve duty cycle within the physically-observed minimum and maximum operation values, 2) minimal changes in droplet size distribution and 3) minimal distortion of spray pattern. A flowchart of the algorithm's operation logic appears in FIG. 6. The algorithm first read nozzle type and corresponding nozzle data and the desired flowrate and duration (period). The algorithm was written to allow for variable duty cycle between the minimum and maximum of the controlled flow range. If a flow of greater than maximum duty cycle was required, then the program would default to a full flow (continuous on) signal output to the control valve circuit. If a flow of less than minimum flow was required, then the program would default to a minimum frequency and duty cycle signal output to the control valve.

For prediction (or indirect measurement) of flow through each nozzle during controller operation, pressure at the interface was sampled at a minimum rate of 1.0 kHz and stored as data files using the interface board and microcomputer in the process controller 34. The data were collected for four cycles) corresponding to 320 to 533 ms. of operation) of the actuation signal. During the test periods, the pressure at the inlet of the controller valve and the electrical excitation signal were also sampled and recorded. Representative data from the tests of the three nozzle types are illustrated in FIGS. 8A, 8B and 8C. The predicted nozzle flow rate was calculated by converting each pressure data point to an instantaneous flow rate using the flow vs. pressure relationship for each nozzle. The instantaneous flow rate data were then discharged from the nozzle per unit operation time. The predicted flow rate was then compared to the directly measured flow rate. Differences between the predicted and actual flow rates were calculated and appear in the Table B for a number of excitation signal frequencies and duty cycles. For the flat-fan and hollow-cone nozzles, differences between observed flow and predicted flow were consistently small and ranged from 0 to 2.8%. For the solid-cone nozzle, differences were larger and ranged from 1.8 to 14.5%.

TABLE B

Comparisons of directly measured and indirectly estimated flow for selected operating conditions

| Nozzle Type | Frequency (Hz) | Duty (%) | Fraction of Full Flow Meas'd | Fraction of Full Flow Calc'd | Difference Mean (%) | Difference Std Dev (%) |
|---|---|---|---|---|---|---|
| Flat Fan | 7.5 | 50 | 0.65 | 0.66 | 1.2 | 0.025 |
| | 10.0 | 25 | 0.48 | 0.48 | 0.4 | 0.003 |
| | 10.0 | 50 | 0.72 | 0.72 | 0.0 | 0.034 |
| | 10.0 | 65 | 0.86 | 0.87 | 1.7 | 0.032 |
| | 12.5 | 50 | 0.75 | 0.77 | 2.1 | 0.007 |
| Hollow Cone | 7.5 | 50 | 0.59 | 0.60 | 2.0 | 0.020 |
| | 10.0 | 20 | 0.31 | 0.32 | 2.8 | 0.048 |
| | 10.0 | 50 | 0.63 | 0.68 | 0.0 | 0.051 |
| | 10.0 | 60 | 0.73 | 0.72 | 1.1 | 0.011 |
| | 12.5 | 50 | 0.67 | 0.67 | 0.3 | 0.013 |
| Solid Cone | 7.5 | 50 | 0.78 | 0.73 | 6.0 | 0.021 |
| | 10.0 | 10 | 0.44 | 0.38 | 14.5 | 0.004 |
| | 10.0 | 25 | 0.61 | 0.58 | 5.9 | 0.004 |
| | 10.0 | 50 | 0.87 | 0.81 | 6.8 | 0.011 |
| | 10.0 | 65 | 0.97 | 0.95 | 1.8 | 0.176 |
| | 12.5 | 50 | 0.93 | 0.89 | 3.8 | 0.003 |

Dynamic pressure data were also used to investigate the electrical and mechanical behavior of the valve/nozzle device 12. Ideal performance of the modulated valve would result in only two discrete valve positions, viz., fully open or fully closed. Correspondingly, the controller/nozzle interface pressure would have two states, viz., zero pressure and full operating pressure for each cycle of the actuation signal. Ideal operation would imply that the nozzle would spend no time operating at partial operating pressure. Under such conditions, distortion of droplet size spectra and spray pattern are minimized.

Practically, actual valve operation differs from the ideal, and during some proportion of operating time the valve core is only partially open. To characterize the controller dynamic operation, inferences were drawn from the pressure sensed at the valve/nozzle interface. As shown in FIG. 7A, 7B and 7C, the interface pressure was observed to be out of phase, i.e., lagging the actuation signal. Since the solenoid valve is an almost purely inductive electrical load and the magnetic flux necessary to move the valve core is dependent on current through the coil, this characteristic lag as expected. A characteristic rise time for the pressure to reach the steady high state and an analogous fall time to the low (zero pressure) steady were noted. In use as a flow controller, the lag time between actuation signal leading edge and pressure rise would not be as important as the relative proportion of the operating time spent in the pressure transient zones. However, if the valve/nozzle devices 12 are used for a target detection/intermittent sprayer control system where spray timing is important, the time delay between actuation and valve response becomes an important design and operation consideration. In such a case, data from the motion/speed sensing system is a critical system parameter.

Analysis of the controller dynamic response was focused on determination of two parameters of the valve/nozzle system, viz., the absolute time required for valve opening and closing and the relative time during which the nozzle operating pressure was a fraction of the full operating pressure. For determination of the absolute time required for valve operation, the delay between the actuation signal transition (low to high) and the attainment of 75% of the operating pressure at the controller/nozzle interface was measured. The delay time was further partitioned into two regions. The first region represented the time delay between the transition of the actuation signal and attainment of 10% of the operating pressure at the interface. This delay represented the time required for the electrical field to build and for the solenoid core/valve tip to begin to crack open. The second region was defined as time delay between attainment of 10% and 75% of the operating pressure at the interface. The second region represented the time required for the core/tip to physically open. For closing, an analogous development of the two regions was done.

The measured time delays for the valve when operated with each nozzle appear in Table C. In all cases, the time required for the electrical field to build or collapse and the core to begin moving was much greater than the time required for the core to physically open or close, respectively. An apparent relationship between characteristic valve operation and pressure differential across the valve was noted. At the nozzle operating pressure of 231, 276 and 517 kPa, the mean time required for the core to begin movement was 7.4, 10.3 and 18.2 ms, respectively. Conversely, the mean time required for the core to begin closing was 36.3, 30.5 and 27.2 ms for the 231, 276 and 517 kPa operating pressure, respectively. Therefore, as pressure increased, more time was required for valve opening and less time was required for valve closing. Since the valve was normally closed, this trend was consistent with intuition. With increasing pressure, increased force (and corresponding, increased magnetic flux) was required for valve operation. The necessary flux would require greater electrical current which would require more time for the current to reach the necessary level.

As shown in FIGS. 8A, 8B and 8C, the droplet size spectra, especially the volume median diameter of the spray droplets from the nozzles, (flat-fan, hollow-cone and solid-cone nozzles) was relatively unaffected by and substantially constant across the entire typical 3:1 (30% to 90%) range of flow control.

FIGS. 9A, 9B and 9C represent observed experimental data which show the spatial distribution of spray from flat-fan, solid-cone and hollow-cone nozzles. These figures indicate that the spatial distribution of the spray pattern for each of the nozzles was only slightly affected by flow control.

TABLE C

Experimentally determined opening and closing times for control valve at each excitation frequency and nozzle tip.

| Nozzle Type | Frequency (Hz) | Time to Open (ms) % of Operating Pressure | | Time to Close (ms) % of Operating Pressure | |
|---|---|---|---|---|---|
| | | 0%–10% | 10%–75% | 100%–75% | 75%–10% |
| Flat | 7.5 | 10.66 | 4.16 | 30.75 | 6.25 |
| Fan | 10.0 | 9.63 | 4.75 | 30.38 | 5.69 |
| | 12.5 | 10.65 | 4.95 | 30.25 | 6.30 |
| Hol- | 7.5 | 19.33 | 6.00 | 28.33 | 7.89 |
| low | 10.0 | 18.00 | 5.83 | 26.66 | 9.42 |
| Cone | 12.5 | 17.33 | 5.93 | 28.13 | 9.27 |
| Solid | 7.5 | 10.22 | 2.78 | 36.22 | 11.33 |
| Cone | 10.0 | 9.25 | 6.50 | 36.42 | 9.92 |
| | 12.5 | 9.00 | 2.60 | 36.10 | 4.20 |

Actual tests of the devices described above embodying principles of the present invention have demonstrated sprayer operation that provides effective and efficient application of liquid materials to various targets while allowing for flowrate changes that compensate for sprayer travel speed or changes in target characteristics with little pattern and droplet size distortion.

To those skilled in the art to which this invention relates, many changes in construction and widely differing embodiments and applications of the invention will make themselves known without departing from the spirit and scope of the invention. The disclosure and the description herein are purely illustrative and are not intended to be in any sense limiting.

What is claimed is:

1. A valve/nozzle device for spraying liquid in a predetermined pattern and at a controllable flowrate comprising:
    body means having an inlet connected to a liquid supply and an outlet source, movable means within said body means for allowing liquid flow through said outlet in a fully open first position and for preventing liquid flow through said outlet in a fully closed second position;
    actuator means for moving said movable means back and forth between said first and second positions to allow liquid to flow through said outlet intermittently in said first position;
    means for controlling said actuator means so that the time for moving said movable means from said first to said second positions is relatively brief in relation to the time spent in said fully open first position; and
    nozzle means connected to said body means adjacent said outlet for providing a desired spray pattern of said liquid;
    whereby droplet size spectra and spray pattern distortion of the sprayed liquid is minimized for different flowrates from said device.

2. The valve/nozzle device of claim 1 wherein said movable means is a reciprocating solenoid actuator.

3. The valve/nozzle device of claim 2 wherein said means for moving said movable means comprises a coil within said body means adapted for connection with a square wave generator.

4. The valve/nozzle device of claim 3 wherein said movable means includes a spring means for moving said movable means in one direction of travel.

5. The valve/nozzle device of claim 1 wherein said body means is generally cylindrical and has a tubular sleeve connected at one end to said inlet and extending axially therein to said outlet at its other end;
    a fixed annular core member inside said sleeve;
    a coil surrounding said sleeve;
    an annular ring member having a central opening and attached to said other end of said sleeve adjacent said body means;
    said movable means comprising a cylindrical member within said sleeve in line with said fixed core member, said cylindrical member having a tapered end portion adapted to close said orifice in said ring member when moved axially away from said fixed core; and
    said nozzle means being connected to said ring member.

6. The valve/nozzle device of claim 5 wherein said nozzle means has an orifice with a preselected configuration and is shaped to form a small chamber between said orifice and the opening in said ring member.

7. The valve/nozzle device of claim 6 including a pressure sensor connected to said ring member for measuring pressure in said small chamber.

8. A liquid spraying system for spraying a plurality of targets having different characteristics while there is relative movement between said system and said targets, said system comprising:
    target sensing means for producing signals relative target characteristics and movement relative to said system;
    process controller means for receiving and processing said signals from said target sensing means to produce output signals relative to a desired flowrate to be used for said targets;
    a nozzle device connected to a liquid supply including means for allowing intermittent on-off cycling of its liquid output from a fully open first position to a fully closed second position wherein the time for moving from said first to said second position is relatively brief in relation to the time spent in said fully open first position;
    nozzle controller means including a square wave generator for receiving said output signals from said process controller means and providing activating square wave pulses to said nozzle device at a frequency and duty-cycle which causes said on-off cycling and provides a desired flowrate while minimizing droplet size spectra and spray pattern distortion for different flowrates.

9. The spraying system of claim 8 wherein said nozzle device comprises a solenoid actuator including a movable valve member which reciprocates in response to pulses from said nozzle controller between a closed position causing no liquid flow to a fully opened position allowing full flow to produce a desired flowrate, and a nozzle member having an orifice providing a preselected spray pattern.

10. The spraying system of claim 9 including a pressure transducer on said nozzle device and adjacent said nozzle member for providing a feedback control signal to said nozzle controller.

* * * * *